J. Sheward,

Jaw Trap,

N° 8,846.  Patented Mar. 30, 1852.

UNITED STATES PATENT OFFICE.

JAMES SHEWARD, OF SOMERSET, OHIO.

RAT-TRAP.

Specification of Letters Patent No. 8,846, dated March 30, 1852.

*To all whom it may concern:*

Be it known that I, JAMES SHEWARD, of Somerset, in the county of Perry and State of Ohio, have invented a new and useful Machine for Killing Animals and Throwing Their Dead Bodies from the Same; and I do hereby declare that the following is a full, clear, and exact description of the same, reference being had to the accompanying drawings, forming part of this specification, in which—

Figure 1:
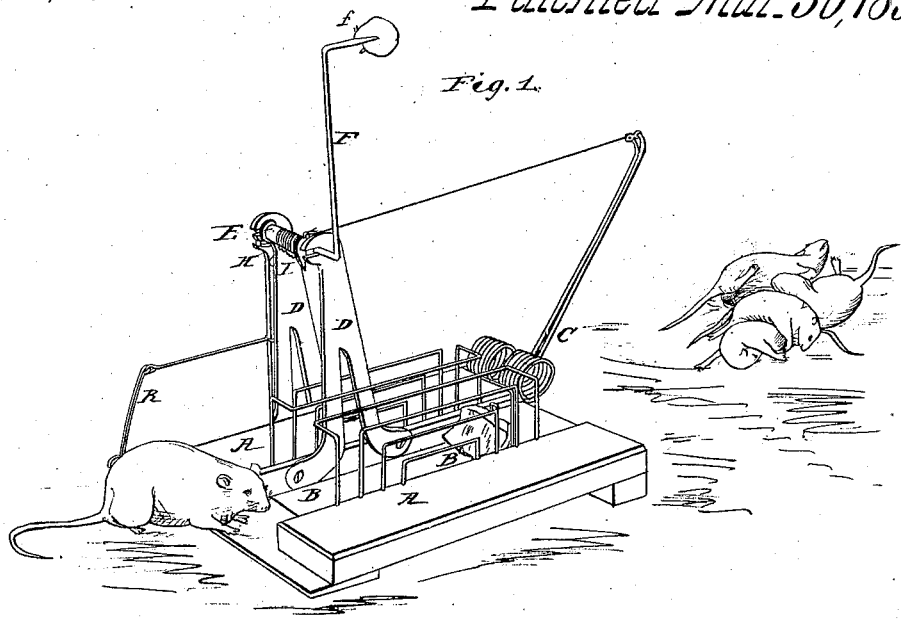
Figure 2:
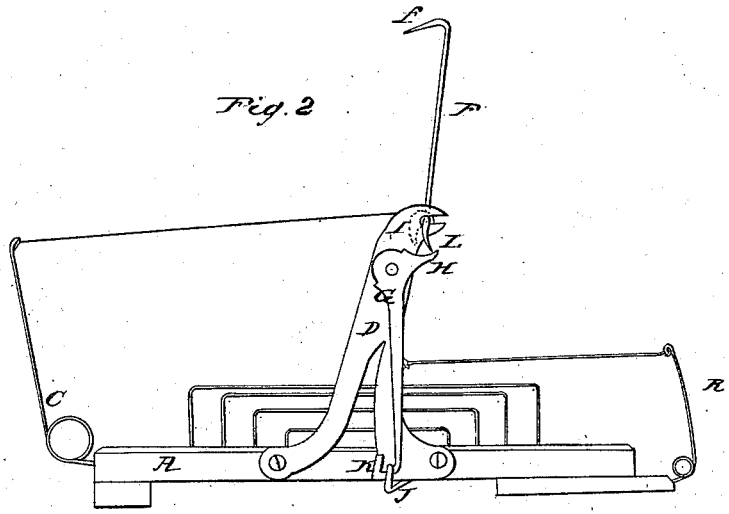

Figure 1, is a perspective view of the machine set, Fig. 2 an elevation exhibiting the side not seen in Fig. 1, and the arrangement of the trigger, &c.

Similar letters of reference indicate corresponding parts in each of the several figures.

The nature of my invention consists in constructing a machine or implement that by a rotary motion imparted to it either by springs, weights, or other motive power an animal approaching the bait is instantly killed and thrown from the trap. Not only being certain in its action, but from its affording no opportunity of the scent of the animal from its habit of urinating when caught being left in it, the trap is always clean and free from this objection (it being well known by rats as well as other animals of like character) that where there has been the scent left, they cautiously approach. It is also self setting so that from one to a hundred may be killed and thrown, after being wound up.

To enable others skilled in the art to make and use my invention I will proceed to describe its construction and operation, referring to the drawings of which—

A A represents the base of the trap or killer formed of two pieces of wood united with cross pieces under their ends; B, B', a balanced treadle, supported between A A, the end next B easily depressed with any weight moving toward the bait placed at B'; C, a strong steel wire spring, used for movable traps but when a fixed trap is wished, a weight cord and pulley may be used instead of C; D, D, are two metal uprights or standards, furnished with slots in which the shaft E turns; F the long arm formed of the shaft bent at right angles, and sufficiently long to reach the head of the animal entering the trap at B. It is provided with a spear or other shaped killer *f*, bent at right angles to the arm and crossing the shaft line at right angles, so that the point of the spear moves in the same plane as the end of the shaft E: L Fig. 2 is a short arm also at right angles to and formed of the shaft E; G a lever pivoted on the outside of one of the standards D, furnished at its upper end with a segmental catch H which arrests the short arm L, the lower end resting against the trigger J, which is connected with the treadle B B'; K, a stop cast on the standard D and prevents the end of the lever G from being thrown too far; I an eccentric and compensating pulley on shaft E, over which the cord from the main spring C passes; K, a slight spring to retract the end of the lever G when the cord is on the short side of the eccentric pulley, and relieves the pressure of the end of the lever on the trigger J and counteracts the action of the spring C.

The wire framing is to prevent approach to the bait, in any other direction than over the treadle at B.

The operation and action of the trap and killer is as follows: When an animal, say a rat, approaching the bait, places his foot on the treadle or hinged platform B B' his weight depresses it and carries down the trigger J and permits the lever to fall behind it, at the same time depresses the segmental catch H and relieves the elbow detent or short arm L permitting it and the shaft, &c., to make a revolution, the long arm furnished with a spear or other shaped killer, half rotates, entering the forehead of the animal, and with the impetus given by the main spring C through the cord, the body is lifted and thrown to an opposite side of the trap 10 or 20 feet to that in which it entered. The treadle B B' being relieved of weight resumes its original position carrying with it and raising the trigger J: the small spring K withdraws the end of lever G from the rear of the trigger, which elevating the segment H on the upper end of this lever intercepts and gradually checks the short arm L on the shaft; as the lever G strikes against the front of the trigger the shaft is checked, and the momentum acquired by the body of the animal from a sufficiently powerful spring is thrown from the killer, at the same instant the trap is re-set.

The animal being killed and thrown, there is no objection to this method of destroying, as in the case of poison, the rat or animal dying in its hole is worse than living.

I do not claim any arrangement by which a living animal may be forced into a cage and retained; nor any arrangement by which an animal may be killed and its body retained, but

What I claim as my invention and desire to secure by Letters Patent is—

The manner of constructing a machine for the killing of animals and throwing their bodies from the trap, and self setting the same, substantially as described and shown.

In testimony whereof I have hereunto signed my name before two subscribing witnesses.

JAMES SHEWARD.

Witnesses:
   JOHN F. CLARK,
   I. S. SMITH.